United States Patent

Suha et al.

[11] Patent Number: 5,977,001
[45] Date of Patent: *Nov. 2, 1999

[54] GLASS COMPOSITION

[75] Inventors: Zoltán Kamill Suha, Budapest; Zsuzsanna Klára Varga, Dunakeszi; Zoltán László Bakó, Dunakeszi, all of Hungary

[73] Assignee: General Electric Company, Cleveland, Ohio

[ * ] Notice: This patent is subject to a terminal disclaimer.

[21] Appl. No.: 08/980,673

[22] Filed: Dec. 1, 1997

[30] Foreign Application Priority Data

Dec. 17, 1996 [HU] Hungary .................. 9603481

[51] Int. Cl.⁶ .............. H01K 1/26; H01K 1/28; C03C 3/085; C03C 3/091
[52] U.S. Cl. ................ 501/66; 501/67; 501/68; 501/69; 501/70; 501/72; 501/64; 313/480; 313/493; 313/636; 313/315; 313/317
[58] Field of Search .............. 501/64, 66, 67, 501/68, 69, 70, 72; 313/493, 116, 636, 315, 317, 480

[56] References Cited

U.S. PATENT DOCUMENTS

| | | |
|---|---|---|
| 3,885,182 | 5/1975 | Chu .......................... 501/66 |
| 4,521,524 | 6/1985 | Yamashita .................. 501/64 |
| 4,562,161 | 12/1985 | Mennemann et al. .......... 501/66 |
| 5,391,523 | 2/1995 | Marlor . |
| 5,525,553 | 6/1996 | Brocheton et al. ............ 501/64 |

FOREIGN PATENT DOCUMENTS 0 603 933 A1  9/1993  European Pat. Off. .

*Primary Examiner*—Michael Marcheschi

[57] ABSTRACT

The invention relates to a glass composition for electric lamps which glass composition comprises $SiO_2$, $Al_2O_3$, $Na_2O$, $K_2O$, $Li_2O$, $B_2O_3$, BaO and SrO and optionally CaO, MgO, ZnO, $P_2O_5$, $Sb_2O_3$, $TiO_2$, $MnO_2$, $Fe_2O_3$ and/or $CeO_2$. The composition according to the invention has a $B_2O_3$ content of 1 to 2.8 mass %, a SrO content of 2.1 to 4.5 mass %, a BaO content of 3 to 6 mass % and of the components being present optionally, the amount of CaO is maximum 1 mass %, that of MgO is maximum 2.4 mass % and that of ZnO is maximum 3 mass %, on the condition that the total amount of SrO and $B_2O_3$ is at least 3.6 mass %, the total amount of CaO and MgO is maximum 2.4 mass % and the total amount of MgO and ZnO is maximum 4.5 mass %.

10 Claims, 2 Drawing Sheets

GLASS COMPOSITION

The invention is related to a glass composition which is suitable for use primarily in electric light sources.

Some glass parts of electric lamps such as stems of incandescent and fluorescent lamps and the exhaust tubes thereof as well as the bulbs of some fluorescent lamps have been made of glasses with relatively high (20 to 29 mass %) lead oxide content for a long time. This high lead oxide content provides for the high electrical resistance expected and, at the same time, for the acceptable softness and good workability of the glass material. It is known however that lead containing glass, in the form of waste produced both during lamp manufacturing and at the users, exerts harmful effects on the environment. Thus, based on environment protection considerations, one has to make efforts to reduce/eliminate lead content in/from mass products made of glass. A European patent application No. EP 603 933 has been elaborated which discloses lead-free glass compositions for use in electric lamps, primarily for stem glasses. Although the glass compositions described in it well approximate the lead-containing ones as to their application parameters (e.g. electrical resistance, workability, thermal expansion), their corresponding viscosity values are substantially above that of the lead glass. Owing to this, they require higher flame temperatures or more energy in the process of lamp-making which is particularly disadvantageous in case of high-speed production lines. It is a further disadvantage that these glass compositions contain a substantial amount of barium oxide (7 to 11 mass % BaO). Although BaO is less hazardous than PbO according to present environmental specifications, it is still poisonous and its amount is desirable to be reduced first of all owing to labor hygiene considerations.

In the glass compositions according to the European patent application No. 603 933, BaO ensures primarily the high electrical resistance required (and serves for replacing PbO in this respect) and enables the glass to have good workability. According to the disclosure mentioned, the lower limit value of BaO amount is of critical importance: if BaO is used in amounts below 7 mass %, not only the electrical resistance of the glass will be lowered but, at the same time, its melting, softening and working temperatures will be substantially higher which will spoil glass workability to a great extent.

U.S. Pat. No. 5,391,523 describes lead-free glass compositions which are softer than those described in the European patent application No. 603 933 considering their viscosity values. Thus, they approximate lead glasses more closely in this respect. Related to the control over the viscosity curve, BaO and $Li_2O$ are considered as components of key importance. BaO, in addition to CaO, also serves for ensuring the required high electrical resistance in the glass composition. The authors specify 2.5 to 5.7 mass % for the total amount of CaO and MgO noting that if the ratio of CaO, which increases electrical resistance, is reduced within the above range, the amount of BaO must be increased for compensation. BaO content of the glass composition is 6.2 to 10.5 mass % (8.0 mass % is thought to be the optimum value) thus it is only slightly lower than that specified in the European patent application No. 603 933.

We have set ourselves the objective to create a glass composition for use primarily in electric lamps in which glass composition the amount of BaO can be lowered significantly without the impairment of electrical resistance and workability parameters (primarily viscosity values) of the glass.

Our investigations have led to the recognition that by appropriately choosing the components of the glass composition, the objective set can be completely achieved. Some application parameters of the new glass compositions will even be more favorable either than those of the known PbO-containing compositions or those of the known BaO-containing compositions with high BaO content. As an example, the electrical resistance ($T_{K100}$) of the new glass composition is identical with or higher than that of the lead glass and reaches the resistance of both glasses with high BaO content described above. Working temperature and viscosity parameters of the new glass composition are very close to those of the lead glass and are significantly more favorable than those of the glass compositions with high BaO content according to the European patent application No. 603 933.

Thus, the invention relates to a glass composition for electric lamps which glass composition comprises $SiO_2$, $Al_2O_3$, $Na_2O$, $K_2O$, $Li_2O$, $B_2O_3$, BaO and SrO and optionally CaO, Mg $P_2O_5$, $Sb_2O_3$, $TiO_2$, $MnO_2$, $Fe_2O_3$ and/or $CeO_2$. The composition according to the invention is characterized in that it has a $B_2O_3$ content of 1 to 2.8 mass %, a SrO content of 2.1 to 4.5 mass %, a BaO content of 3 to 6 mass % and of the components being present optionally, it has a CaO content of maximum 1 mass %, a MgO content of maximum 2.4 mass % and a ZnO content of maximum 3 mass % on the condition that the total amount of SrO and $B_2O_3$ is at least 3.6 mass %, the total amount of CaO and MgO is maximum 2.4 mass % and the total amount of MgO and ZnO is maximum 4.5 mass %.

Figure 1:
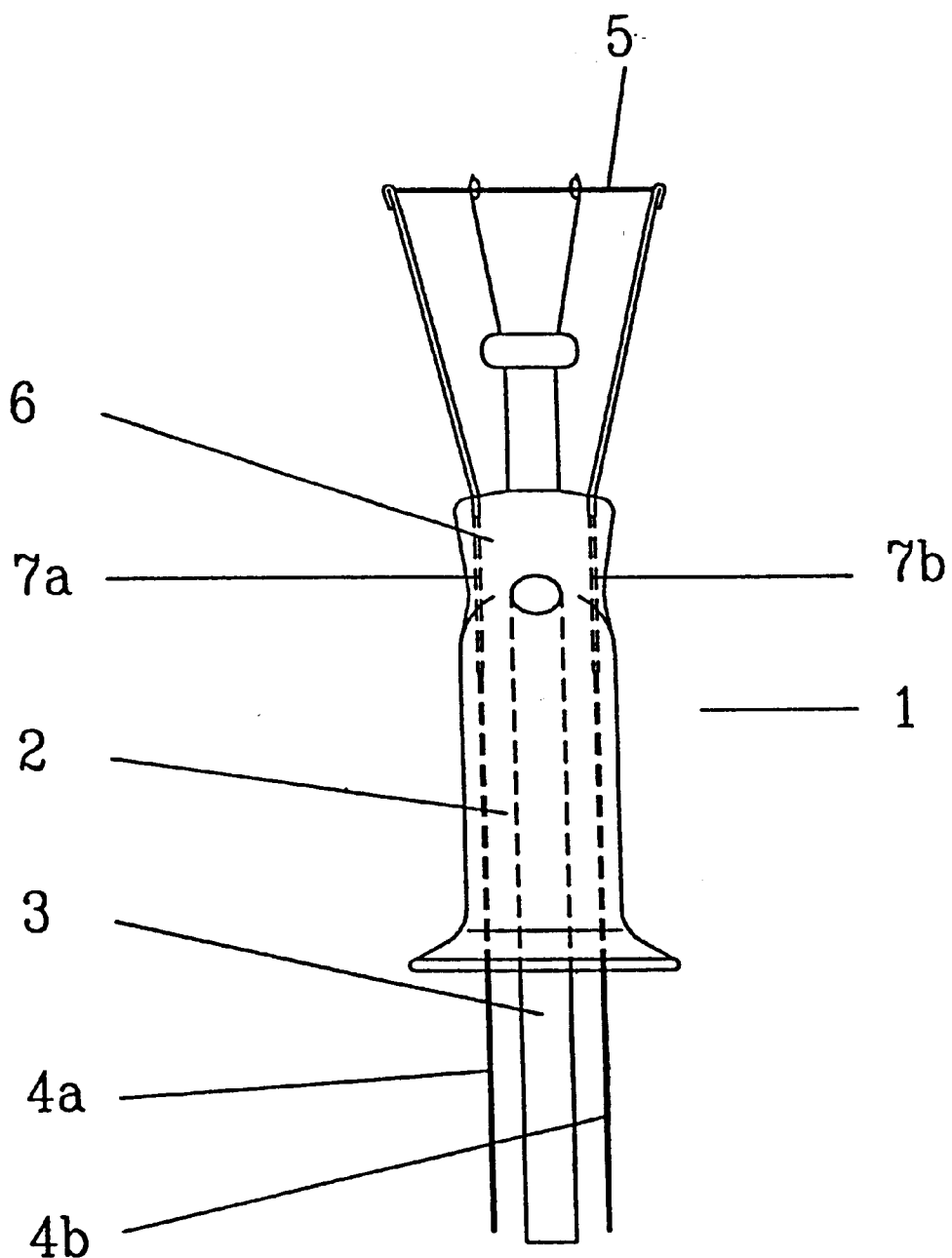
FIG. 1 is a front elevation view of an incandescent lamp.

One of the fundamental features of the glass compositions according to the invention is that their BaO content is significantly lower than that of the lead-free, BaO-containing glasses listed in the disclosures mentioned earlier. BaO content of the glass compositions according to the invention may be 3 to 6 mass %, preferably 4.0 to 5.5 mass %. Thus, BaO content of the glass compositions according to the invention does not, even in the extreme case, reach 7 mass % declared as critical in respect of workability in the European patent application No. 603 933. The glass compositions according to the invention have a further essential feature different from those described in the above disclosures that the total amount of their CaO and MgO content cannot exceed 2.4 mass %. Within this, the glass composition according to the invention may contain CaO in 0 to 1 mass % and MgO in 0 to 2.4 mass %, preferably in 0 to 1.6 mass %, particularly preferably in 0.4 to 1.6 mass %. Thus the glass compositions according to the invention have very low CaO and MgO contents, moreover they may optionally be completely free from CaO and/or MgO. According to the European patent application No. 603 933, the presence of CaO and MgO is responsible for the improvement of workability and so does the presence of BaO for the effect of an increase in electrical resistance. According to the U.S. Pat. No. 5,391,523 CaO must not be omitted in order to obtain the required high electrical resistance, and BaO, in addition to increasing electrical resistance, controls the viscosity curve of the glass favorably. From this knowledge an expert may conclude that decreasing the amount of both BaO and CaO significantly (or even omitting the latter component) will substantially lower the electrical resistance of the glass and will impair its workability to a great extent. Our experiences obtained in our practice are entirely contradictory to this expectation.

It is a further essential feature of the glass compositions according to the invention that they contain $B_2O_3$ in 1 to 2.8 mass % (preferably in 1.5 to 2.4 mass %) and SrO in 2.1 to 4.5 mass % (preferably in 2.5 to 4.0 mass %) on the condition that the total amount of $B_2O_3$ and SrO must be at least 3.6 mass %. By choosing both components appropriately in accordance with our experience, the shape of the viscosity curve of the glass will be affected favorably, working temperature will be lowered and a glass melt workable in a wide temperature range (a so-called "long" glass) will be produced. It is known from the literature that $B_2O_3$ has a melting effect resulting in softening the silicate glass, i.e. lowering its melting and working temperature. However, we have experienced that by exceeding a limit in the glass system according to the invention, boron will unfavorably "shorten" the glass and will raise its transformation temperature because it tends to build up a quadruple coordination in the presence of $Na_2O$ and $K_2O$. Thus, we have found that the upper limit of the amount of $B_2O_3$ is critical.

SrO increases the electrical resistance of the glass in addition to affecting the viscosity curve of the glass favorably.

It is a further novel feature of the glass compositions according to the invention that they may contain also ZnO optionally. The amount of ZnO may be 0 to 3 mass %, preferably 1.5 to 3 mass %, the condition, however that the total amount of MgO and ZnO must not exceed 4.5 mass %. Within this range, both MgO and ZnO exert a stabilizing effect on the glass structure, i.e. they diminish its susceptibility to segregation and crystallization. ZnO also affects workability of the glass favorably.

The glass composition s according to the invention may also contain $TiO_2$ and/or $P_2O_5$ optionally. Both components exert a structure stabilization effect, they diminish its susceptibility to segregation and crystallization or lower the liquids temperature of the glass. The amount of $TiO_2$ may be maximum 0.5 mass % and that of $P_2O_5$ may be maximum 0.7 mass %.

The glass compositions according to the invention may contain 66.5 to 73 (preferably 68 to 71.6) mass % of $SiO_2$, 1.5 to 4 (preferably 2 to 3.5) mass % of $Al_2O_3$, 5.5 to 8 (preferably 5.8 to 7) mass % of $Na_2O$, 7.2 to 10 (preferably 7.7 to 9.0) mass % of $K_2O$ and 0.7 to 1.7 (preferably 1.0 to 1.5) mass % of $Li_2O$. Of the components being present optionally, the amount of $Sb_2O_3$ may be maximum 1 mass %, that of $CeO_2$ may be maximum 0.8 mass %, that of $MnO_2$ may be maximum 0.25 mass % and that of $Fe_2O_3$ may be maximum 0.25 mass %.

The boron trioxide component is preferably added to the mix used for glass melting in the form of borates (e.g. anhydrous borax /$Na_2B_4O_7$/) or as a mineral containing a borate (e.g. magnesium hydroborate). $B_2O_3$ added in the form of a borate or a mineral in the amount specified exerts no significant corrosion effect on the wall of the furnace.

It is a special advantage of the glass composition according to the invention that it is equally suitable for producing stem glasses, fluorescent lamp bulb glasses and other specialty products (e.g. bulb glasses for miniature incandescent lamps). Owing to this, products can be made from the same melting furnace for several different purposes even at the same time. This makes possible to build up the optimum manufacturing capacity in a more practical way.

It is preferable to use $CeO_2$ in the glass compositions according to the invention primarily in the case when (also) fluorescent lamp bulb glasses are intended to be made from the compositions. This component is suitable first of all for reducing UV emission from the bulb glass, however it can also act as a fining agent. Using this latter technique the glass composition can be melted also in a completely electrically heated furnace. Some of the optionally used components such as $Sb_2O_3$, $Fe_2O_3$, $P_2O_5$ and $MnO_2$, e.g. $Fe_2O_3$ may already be present as contaminant in mix of glass melting thus eliminating the need to add it separately.

The glass compositions according to the invention can be good replacements for the presently used lead glasses with respect to thermal expansion, electric resistance and viscosity which is characteristic of workability and, at the same time, they can be applied more advantageously than the glass compositions containing larger amounts of BaO. Owing to their more favorable viscosity parameters, the glass compositions according to the invention can be melted and processed with less energy consumption than the materials according to European patent application No. 603 933. Their liquids point value ($T_{liq}$), which is characteristic of the susceptibility to crystallization, is also substantially lower than that of the glass compositions according to European patent application No. 603 933 and that of the lead glass. The crystallization experienced at the glass composition according to the invention has a lower intensity which indicates the good stability. The glass compositions according to the invention have an outstanding resistance to chemical corrosion (water durability) which is an extremely surprising result considering their high alkali oxide content.

The following example is given for the composition details and application parameters of the glass compositions according to the invention.

EXAMPLE

The glass compositions given in Table I were melted by 50-kg batches at 1470 to 1480° C. in an intermittently-running natural gas-heated tank furnace. The components listed in Table I were added in the following forms: $SiO_2$ as quartz sand, $Al_2O_3$ and $Li_2O$ as spodumene as well as lithium carbonate, $B_2O_3$ as dehydrated borax, $K_2O$, $Na_2O$, BaO and SrO as the corresponding carbonates while the further components as the corresponding oxides. $Sb_2O_3$ and/or $CeO_2$ as well as sodium nitrate ($NaNO_3$) or the combination of sodium sulfate and starch were used for fining agents. The latter was added optionally together with $CeO_2$. CaO and $Fe_2O_3$ were not weighed in separately, these materials were present as contamination of the other components. The components, which were used in small amounts or which can be homogenized with difficulty (MgO, $SrCO_3$, $Sb_2O_3$, $NaNO_3$, $TiO_2$, $CeO_2$, starch, bone ash, etc.), were premixed with a small quantity of sand in a laboratory mixer and added to the further components in a mixer drum. Melting was carried out using the process usually applied in glass industry after 30 minutes of homogenization. The compositions produced a good quality and fine melt with favorable workability using both fining techniques.

The mass % values of components of a typical glass composition made according to the above example and its application parameters are summarized in Table I and Table II, respectively. For comparison, the corresponding data of a known glass composition with 20% PbO-content (designated with "P" in Table II) and the glass composition described in the example of European patent application No. 603 933 (designated with "B") are also given in Table II. The meanings of the further symbols used in Table II are as follows:

α(50–350): thermal expansion coefficient between 50 and 350° C. (according to ISO Standard 7991)

$T_g$: (dilatometric) transformation temperature (according to ISO Standard 7884-8)

$T_L$: Littleton softening point (according to ISO Standard 7884-6)

$T_{K100}$: the temperature where log ρ (Ω cm)=8(log ρ is the common logarithm of the direct-current specific resistance value)

$T_{liq}$: liquids temperature above which the glass (after a heat treatment of 24 hours) shows no crystallization)

water durability: chemical resistance to distilled water (extraction) as measured on crushed glass and characterized by the quantity of 0.01 N acid consumed for back titration (according to DIN Standard 12111)

$T_{work}$: working temperature where the viscosity value η=10⁴ dPas.

TABLE I

| Component | Amount in mass % |
| --- | --- |
| $SiO_2$ | 69.74 |
| $Al_2O_3$ | 2.86 |
| $Na_2O$ | 6.46 |
| $K_2O$ | 8.21 |
| $Li_2O$ | 1.33 |
| BaO | 4.71 |
| SrO | 3.53 |
| CaO | 0.01 |
| MgO | 0.89 |
| $B_2O_3$ | 1.90 |
| $TiO_2$ | 0.01 |
| $P_2O_5$ | 0.01 |
| $Sb_2O_3$ | 0.30 |
| $Fe_2O_3$ | 0.03 |

TABLE II

| Physical parameter | According to the invention | Glass sample "P" | Glass sample "B" |
| --- | --- | --- | --- |
| α(50–350) × 10⁻⁷ (1/° C.) | 98 | 98.9 | |
| α(25–300) × 10⁻⁷ (1/° C.) | | | 92.5 |
| $T_g$ (° C.) | 470 | 441 | |
| $T_L$ (° C.) | 665 | 630 | 675 |
| $T_{work}$ (° C.) | 992 | 1000 | 1020 |
| $T_{K100}$ (° C.) | 290 | 280 | 290 |
| Water durability (ml/g) | 0.9 | 2.5 | |
| Density (g/cm³) | 2.56 | 2.8 | 2.62 |
| $T_{liq}$ (° C.) | 680 | 850 | 840 |

The glass composition according to the invention can, of course, be used in all fields where the advantages provided by the properties of the glass are needed, especially in case of glass parts of electric lamps. The glass composition according to the invention can be applied primarily for stems and exhaust tubes of incandescent filament lamps and low-wattage discharge lamps as well as for bulbs and exhaust tubes of low-pressure discharge lamps preferably of compact fluorescent lamps. It can be also applied for bulbs of miniature incandescent lamps.

The subject of the invention also includes those glass parts of electric lamps the material of which consists of the glass composition according to the invention.

Figure 2:
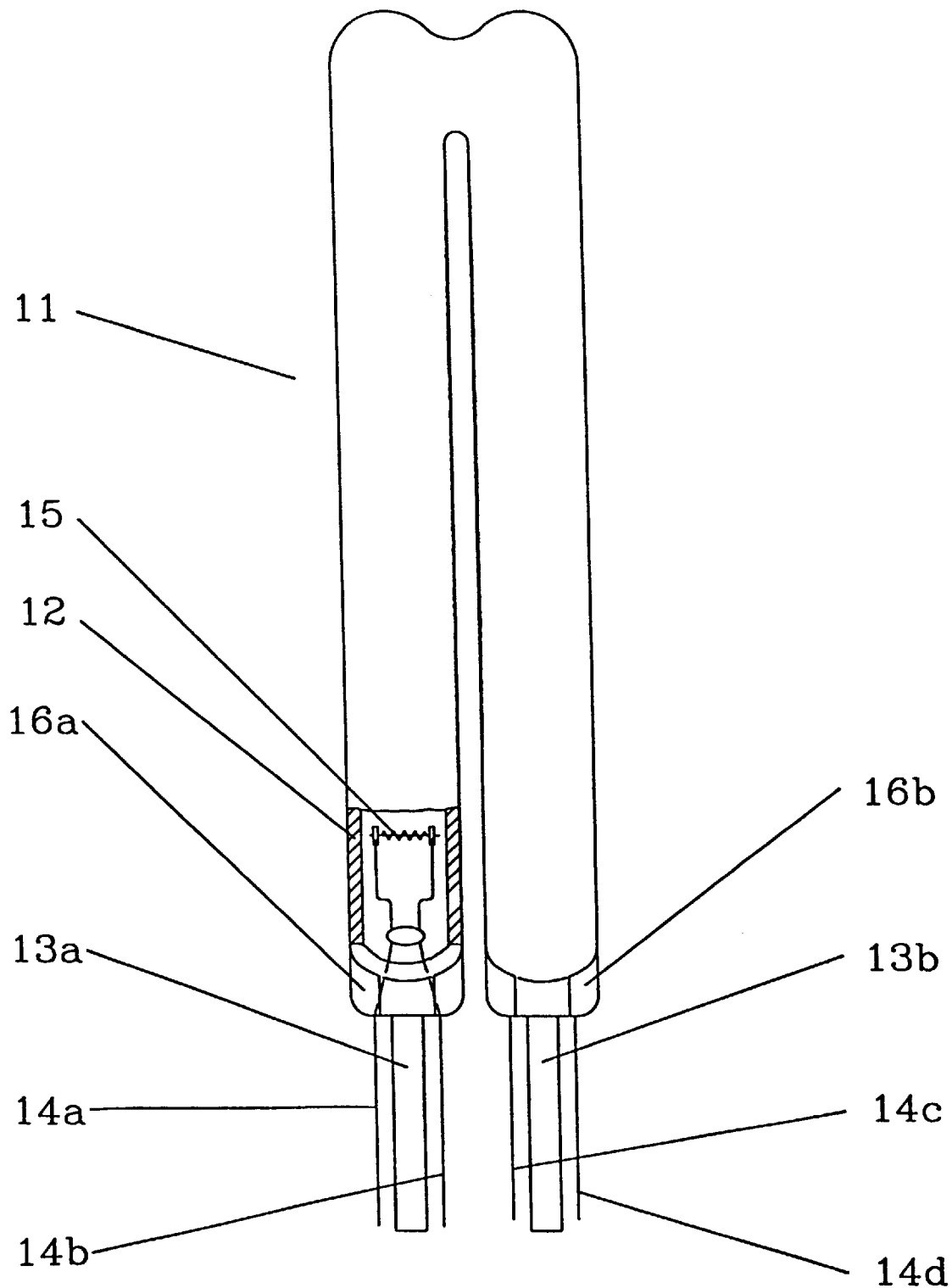
FIG. 2 is a front elevation view of a compact florescent lamp.

As examples, a stem assembly of an electric lamp and a compact fluorescent lamp are illustrated in FIGS. 1 and 2, respectively.

In FIG. 1, a stem 1 of an incandescent lamp is seen which consists of: a stem flare 2, current feedthroughs 4a and 4b, an incandescent filament 5 and an exhaust tube 3. The filament 5 is clamped between the ends of the multiple-part current feedthroughs 4a and 4b. On the production line, the listed parts are heated by flames and having pinched stem flare 2, the parts are sealed so that the dumet parts (iron-nickel alloy with a copper mantle) 7a and 7b of the current feedthroughs 4a and 4b are placed inside the pinched portion 6 of the stem flare 2. The material of the stem flare 2 and the exhaust tube 3 is the glass composition according to the invention. The material of the lamp bulb (not shown) is an alkali-lime silicate soft glass comprising the following base components: $SiO_2$, $Na_2O$, $K_2O$, CaO, MgO, $Al_2O_3$. On the production line, the stem flare 2 is sealed at its flanged portion in the lamp bulb.

The stem according to the invention may be not only a stem of an incandescent lamp but that of an electric lamp of another type also, e.g. of a low-pressure discharge lamp particularly of a linear fluorescent lamp etc.

In FIG. 2, a compact fluorescent lamp 11 comprising two tube portions is seen. Current feedthroughs 14a and 14b of electrode 15 and current feedthroughs 14c and 14d of the other electrode (not shown) as well as exhaust tubes 13a and 13b are sealed in the ends of bulb 12 at pinched portion 16a and 16b. The material of the current feedthroughs 14a, 14b, 14c and 14d is a 50/50% nickel-iron alloy. The material of the bulb 12 and the exhaust tubes 13a, 13b is the glass composition according to the invention. The material of the bulb 12 contains $CeO_2$ in a mass percent over 0, preferably in 0.3 to 0.6 mass % in order to filter out UV radiation.

We claim:

1. An electric lamp constructed in part of a glass having a composition containing $SiO_2$, $Al_2O_3$, $Na_2O$, $K_2O$, $Li_2O$, $B_2O_3$, BaO and SrO and optionally CaO, MgO, ZnO, $P_2O_5$, $Sb_2O_3$, $TiO_2$, $MnO_2$, $Fe_2O_3$ and $CeO_2$ wherein the $B_2O_3$ content is 1 to 2.8 mass %, SrO content is 2.1 to 4.5 mass %, BaO content is 3 to 6 mass %, $Al_2O_3$ content is 1.5–4 mass percent, $Li_2O$ content is 0.7–1.7 and of the components being present optionally, the amount of CaO is maximum 1 mass %, that of MgO is maximum 2.4 mass % and that of ZnO is maximum 3 mass %, on the condition that the total amount of SrO and $B_2O_3$ is at least 3.6 mass %, the total amount of CaO and MgO is maximum 2.4 mass % and the total amount of MgO and ZnO is maximum 4.5 mass %.

2. The lamp according to claim 1 wherein said glass contains BaO in an amount of 4.0 to 5.5 mass %.

3. The lamp according to claim 1 wherein said glass contains SrO in an amount of 2.5 to 4.0 mass %.

4. The lamp according to claim 1 wherein said glass contains $B_2O_3$ in an amount of 1.5 to 2.4 mass %.

5. The lamp according to claim 1 wherein said glass contains MgO.

6. The lamp according to claim 5 wherein the glass contains MgO in an amount of 0.4 to 1.6 mass %.

7. The lamp according to claim 1 wherein said glass contains $SiO_2$ in 66.5 to 73 mass %, $Na_2O$ in 5.5 to 8 mass %, $K_2O$ in 7.2 to 10 mass %, and optionally $Sb_2O_3$ in maximum 1 mass %, $CeO_2$ in maximum 0.8 mass %, $TiO_2$ in maximum 0.5 mass %, $P_2O_5$ in maximum 0.7 mass %, $MnO_2$ in maximum 0.25 mass % and $Fe_2O_3$ in maximum 0.25 mass %.

8. The lamp according to claim 7 wherein said glass contains $SiO_2$ in 68 to 71.6 mass %, $Al_2O_3$ in 2 to 3.5 mass %, $Na_2O$ in 5.8 to 7 mass %, $K_2O$ in 7.7 to 9 mass %, $Li_2O$ in 1.0 to 1.5 mass % and optionally $Sb_2O_3$ in maximum 1 mass %, $CeO_2$ in maximum 0.8 mass %, $TiO_2$ in maximum 0.5 mass %, $P_2O_5$ in maximum 0.7 mass %, $MnO_2$ in maximum 0.25 mass % and $Fe_2O_3$ in maximum 0.25 mass %.

9. A stem for an electric lamp, across which current feedthroughs are introduced and sealed in a vacuum-tight manner, wherein the stem is sealed in a vacuum-tight manner in a bulb of the lamp, the stem having a composition containing $SiO_2$, $Al_2O_3$, $Na_2O$, $K_2O$, $Li_2O$, $B_2O_3$, BaO and SrO and optionally CaO, MgO, ZnO, $P_2O_5$, $Sb_2O_3$, $TiO_2$, $MnO_2$, $Fe_2O_3$ and $CeO_2$ wherein $B_2O_3$ content is 1 to 2.8 mass %, SrO content is 2.1 to 4.5 mass %, BaO content is 3 to 6 mass %, $Al_2O_3$ content is 1.5–4 mass %, and $Li_2O$ content is 0.7–1.7 mass %, and of the components being present optionally, the amount of CaO is maximum 1 mass %, that of MgO is maximum 2.4 mass % and that of ZnO is maximum 3 mass %, on the condition that the total amount of SrO and $B_2O_3$ is at least 3.6 mass %, the total amount of CaO and MgO is maximum 2.4 mass % and the total amount of MgO and ZnO is maximum 4.5 mass %.

10. A bulb for electric lamps having a composition containing $SiO_2$, $Al_2O_3$, $Na_2O$, $K_2O$, $Li_2O$, $B_2O_3$, BaO and SrO and optionally CaO, MgO, ZnO, $P_2O_5$, $Sb_2O_3$, $TiO_2$, $MnO_2$, $Fe_2O_3$ and $CeO_2$ wherein the $B_2O_3$ content is 1 to 2.8 mass %, SrO content is 2.1 to 4.5 mass %, $Al_2O_3$ content is 1.5–4 mass % and $Li_2O$ content is 0.7–1.7 mass %, BaO content is 3 to 6 mass %, and of the components being present optionally, the amount of CaO is maximum 1 mass %, that of MgO is maximum 2.4 mass % and that of ZnO is maximum 3 mass %, on the condition that the total amount of SrO and $B_2O_3$ is at least 3.6 mass %, the total amount of CaO and MgO is maximum 2.4 mass % and the total amount of MgO and ZnO is maximum 4.5 mass %.

* * * * *